United States Patent [19]

Dokuzovic

[11] Patent Number: 4,752,481

[45] Date of Patent: Jun. 21, 1988

[54] FLAVOR EMULSIONS AND CHEWING GUM COMPOSITIONS CONTAINING THE SAME

[75] Inventor: Zdravko Dokuzovic, Mississauga, Canada

[73] Assignee: Warner-Lambert Company, Morris Plains, N.J.

[21] Appl. No.: 942,560

[22] Filed: Dec. 16, 1986

[30] Foreign Application Priority Data

Jun. 19, 1986 [CA] Canada .................................. 511998

[51] Int. Cl.$^4$ .............................................. A23G 3/30
[52] U.S. Cl. ........................................ 426/3; 426/650; 426/651
[58] Field of Search ........................................ 426/3-6, 426/650, 651

[56] References Cited

U.S. PATENT DOCUMENTS

| | | | |
|---|---|---|---|
| 2,435,744 | 2/1948 | Hartman | 426/651 |
| 3,652,291 | 3/1972 | Bedoukian | 426/651 |
| 3,906,116 | 9/1975 | Quesnel et al. | 426/651 |
| 4,105,801 | 8/1978 | Dogliotti | 426/548 |
| 4,157,402 | 6/1979 | Ogawa et al. | 426/5 |
| 4,217,368 | 8/1980 | Witzel et al. | 426/548 |
| 4,292,329 | 9/1981 | Ogawa et al. | 426/5 |
| 4,515,769 | 5/1985 | Merritt et al. | 426/3 |
| 4,604,288 | 8/1986 | Glass et al. | 426/5 |

*Primary Examiner*—Jeanette Hunter
*Attorney, Agent, or Firm*—Gary M. Nath

[57] ABSTRACT

A flavored chewing gum composition having improved flavor perception which comprises a chewing gum base, a sweetener and a flavor containing emulsion system comprising a flavor oil, an emulsifier having a total HLB value of about 1.6 to about 7.0 and an alkyl polyol.

21 Claims, No Drawings

FLAVOR EMULSIONS AND CHEWING GUM COMPOSITIONS CONTAINING THE SAME

The present invention relates to flavor containing emulsion systems and more particularly to chewing gum compositions containing said emulsion systems as a way to flavor chewing gum.

Chewing gums generally contain a water-insoluble gum base, a water insoluble flavoring agent and water soluble sweeteners such as sucrose and corn syrup or in sugarless gum, sorbitol, mannitol and artificial sweeteners. Also incorporated within the gum base may be plasticizers or softeners to improve consistency and texture of the gum. The gum base generally contains a natural rubber gum base, a synthetic rubber gum and or mixtures thereof.

Over the years a considerable amount of developmental activities have involved the preparation of flavoring materials and the need for materials that provide an initial high level of flavor or burst coupled with sustained flavor release for long periods of time.

One of the items encountered during this activity has been the recognition that when free flavor oil is added to gum base, only about 5% to 40% of the initial flavor oil is removed upon chewing. It appears that as much as 95% to 60% of the remaining flavor oil becomes irreversibly bound to the gum base and cannot be chewed out.

To overcome this difficulty various attempts have been made to encapsulate the flavor oils or use dried ingredients to inhibit the gum base binding action. In addition considerable effort has been directed to the development of a delayed release flavoring agent which will delay release of the flavoring agent while permitting uniform release of the flavor over extended periods of time. The obvious benefit of immediate/delayed release is the ability to provide uniform flavor sensation during the entire chew which has not been previously attainable by mere administration of conventional seasonings and flavor oils.

U.S. Pat. No. 3,920,849 to Marmo et al. addresses the concept of extended flavor release and offers a full discussion of the prior art on this subject. The patent directs itself to the preparation of separate flavor components identified as "fixed" (encapsulated) and "unfixed", which are mixed with a suspension agent prior to their addition to a chewing gum base. The patentees contend that this method of preparation and addition to the chewing gum offers improved flavor intensity and uniform flavor transmission. The patentees specifically employ a non-confined hydrophobic flavor oil and a "fixed" hydrolytically releasable flavor oil in combination with a solid suspending agent, as their flavor system. The preparation of the flavors is such that the resulting flavor system is added simultaneously to the gum base.

In similar fashion, U.S. Pat. No. 4,001,438 also to Marmo et al. discloses a flavor composition utilizing a non-confined flavor oil in combination with a flavor oil physically entrapped within solid particles, and a suspending agent combined therewith. All of these ingredients are premixed and thereafter simultaneously added to the product to be flavored. It is significant that the flavor system of this patent is predicated upon an intimate admixture between the non-confined flavor oil and the entrapped flavor oil.

In contrast to the Marmo et al. technique, U.S. Pat. No. 3,826,847 to Ogawa et al. relates to encapsulation of flavoring oils with polyvinyl acetates, that is high molecular weight material. The encapsulated oil is thereafter incorporated into a chewing gum base. Ogawa et al. purport to achieve sequential flavor delivery by the modulation of the coating applied to the respective flavor particles.

While the foregoing patents have been directed to flavor release, the art has concurrently developed to achieve prolonged sweetness release. U.S. Pat. No. 4,217,368 to Witzel is representative of one means utilized to delay sweetener release. This patented system involves using two phases, a water-soluble phase consisting essentially of softener and a first sweetener in particulate form and a relatively water-soluble phase consisting of a plurality of separate and distinct masses suspended in the water-soluble phase, each of said masses comprising gum base and particles of a second sweetener enveloped in the gum base. The prior art has continued to explore encapsulation of sweeteners that will release over extended periods.

U.S. Pat. No. 4,497,832 to Cherukuri et al. relates to a sugar containing chewing gum composition containing a chewing gum base, a sweetener, and a flavoring agent sorbed in the microporous channels of spherical particles wherein the channels increase the particles sorptive surface area.

In contrast U.S. Pat. No. 4,452,821 to Gergely is directed to a confectionery product, especially a chewing gum, having prolonged, extended delivery of flavoring aroma, and/or active pharmaceutical ingredient. This is accomplished by providing the flavoring, aroma, or active pharmaceutical ingredient in a solid solution or mixture within a wax containing functional groups, said wax forming a homogeneous mixture or solid solution. The wax does not contain any functional groups and is substantially immiscible with the flavoring, aroma, or active pharmaceutical ingredient.

Despite these techniques, the prior art has not been fully effective in preparing a chewing gum having long lasting flavor release, initial flavor burst and removal of substantially all of the flavoring agent from chewing gum compositions. It would thus be beneficial to prepare a chewing gum having these combined benefits.

In accordance with the present invention, a stable flavoring agent system has been unexpectedly discovered which involves the use of an emulsion to form a unique combination of flavoring oil, emulsifier and an alkyl polyol. The chewing gum compositions of this invention exhibit a substantial initial flavor release, long lasting flavor during chewing and possess improved flavor stablization. The chewing gums also have long storage stability without product deterioration. When the compositions are chewed, a soft characteristic is evidenced along with an even flavor/sweetness release.

The chewing gum formulations of this invention contain a gum base, sweetener and the flavor containing emulsion system. Additional ingredients described below may also be employed.

The finished chewing gum composition containing the flavoring emulsion unexpectedly exhibits enhanced flavor stability over prolonged periods. This effect is believed to occur from a reduced oxidative potential present in the chewing gums of the invention resulting from oxidation of the free oils in the presence of water/air and the unique combination of ingredients used in the present invention. This reduced oxidative potential is quite important when preparing chewing gum compositions using flavoring agents that would normally undergo oxidative reactions within the formulation. Flavoring agents that primarily undergo such reactions include peppermint oil and citrus flavors, such as lemon, orange, grape, lime and grapefruit. A disadvantage associated with the use of such oils in the past has been their degradation during storage resulting in change in odor and flavor properties. The present invention overcomes this disadvantage.

The chewing gum compositions of this invention are those which, except for the unique flavor containing emulsion system, are known in the art. The gum base used in the instant invention may be any water-insoluble gum base well known in the art. Illustrative examples of suitable polymers in gum bases include both natural and synthetic elastomers and rubbers. For example, those polymers which are suitable in gum bases include, without limitation, substances of vegetable origin such as chicle, jelutong, gutta percha and crown gum. Synthetic elastomers such as butadiene-styrene copolymers, isobutylene-isoprene copolymers, polyethylene, polyisobutylene and polyvinylacetate and mixtures thereof, are particular useful.

The amount of gum base employed will vary greatly depending on various factors such as the type of base used, consistency desired and other components used to make the final product. In general, amounts of about 5% to about 45% by weight of the final chewing gum composition are acceptable for use in chewing gum compositions with preferred amounts of about 15% to about 25% by weight.

The gum base composition may contain elastomer solvents to aid in softening the rubber component. Such elastomer solvents may comprise methyl, glycerol or pentaerythritol esters of rosins or modified rosins, such as hydrogenated, dimerized or polymerized rosins or mixtures thereof. Examples of elastomer solvents suitable for use herein include the pentaerythritol ester of partially hydrogenated wood rosin, pentaerythritol ester of wood rosin, glycerol ester of partially dimerized rosin, glycerol ester of polymerized rosin, glycerol ester of tall oil rosin, glycerol ester of wood rosin and partially hydrogenated wood rosin, and partially hydrogenated methyl ester of rosin and mixtures thereof. The solvent may be employed in an amount ranging from about 10% to about 75% and preferably about 45% to about 70% by weight of the gum base.

A variety of traditional ingredients used as plasticizers or softeners such as lanolin, stearic acid, sodium stearate, potassium stearate, glyceryl triacetate, glycerine and the like, may also be incorporated into the gum base to obtain a variety of desirable textures and consistency properties. These individual additional materials are generally employed in amounts of up to about 30% by weight and preferably in amounts of from about 3% to about 7% by weight of the final gum base composition.

The chewing gum compositions employing the instant gum bases generally contain sweetening agents. The sweetening agent may be selected from a wide range of materials including water-soluble agents, water-soluble artificial sweeteners, and dipeptide based sweeteners, including mixtures thereof. Without being limited to particular sweeteners, representative illustrations encompass:

A. Water-soluble sweetening agents such as monosaccharides, disaccharides and polysaccharides such as xylose, ribose, glucose, mannose, galactose, fructose, dextrose, sucrose, sugar, maltose, partially hydrolyzed starch or corn syrup solids, hydrogenated starch hydrolysate and sugar alcohols such as sorbitol, xylitol, mannitol and mixtures thereof.

B. Water-soluble artificial sweeteners such as the soluble saccharin salts, i.e., sodium or calcium saccharin salts, cyclamate salts, acesulfam-K and the like, and the free acid form of saccharin.

C. Dipeptide based sweeteners such as L-aspartyl-L phenylalanine methyl ester and materials described in U.S. Pat. No. 3,492,131 and the like.

In general, the amount of sweetener will vary with the desired amount of sweetener selected for a particular chewing gum. This amount will normally be 0.01% to about 90% by weight when using an easily extractable sweetener. The water-soluble sweeteners described in category A above, are preferably used in amounts of about 25% to about 75% by weight, and most preferably from about 50% to about 65% by weight of the final chewing gum composition. In contrast, the artificial sweeteners described in categories B and C are used in amounts of about 0.005% to about 5.0% and most preferably about 0.05% to about 2.5% by weight of the final chewing gum composition. These amounts are ordinarily necessary to achieve a desired level of sweetness independent from the flavor level achieved from flavor oils.

The chewing gum composition of this invention may additionally include the conventional additives of coloring agents such as titanium dioxide; emulsifiers such as lecithin and glyceryl monostearate; and fillers such as aluminum hydroxide, alumina, aluminum silicates, dicalcium phosphate, talc and combinations thereof. Preferably the amount of fillers when used will vary from about 25% to about 45% by weight of the gum base.

The novel flavor containing emulsion system of this invention contains a flavoring oil, an emulsifier, and an alkyl polyol selected from the group consisting of glycerin, propylene glycol and mixtures thereof.

Flavoring agents well known to the chewing gum art are used in the emulsion compositions of the instant invention. These flavoring agents may be chosen from synthetic flavoring liquids and/or oils derived from plants, leaves, flowers, fruits and so forth, and combinations thereof. Representative flavoring liquids include: spearmint oil, cinnamon oil, oil of wintergreen (methylsalicylate) and peppermint oils. Also useful are artificial, natural or synthetic fruit flavors such citrus oil including lemon, orange, grape, lime and grapefruit and fruit essences including apple, strawberry, cherry, pineapple and so forth.

The amount of flavoring agent employed is normally a matter of preference subject to such factors as flavor type, strength desired and emulsion constituents. In general amounts of about 19 to about 59% by weight, are employed and preferably about 25 to about 55% by weight of the emulsion system are used. The amounts indicated represent the total amount of flavoring agents used when both single flavors and multiple flavors are employed.

It has been found that the formation of a stable emulsion system is only obtainable when using an alkyl polyol as the outer phase of the emulsion system. Preferably the alkyl polyol is selected from the group consisting of glycerin and propylene glycol. A sufficient amount of alkyl polyol must be employed in order to prepare a system that is stable for long periods of time.

Suitable amounts may range from about 40 to about 80% by weight and preferably from about 45 to about 70% by weight of the emulsion system. Amounts above 80% while useable are not employed since they would not provide for adequate flavor levels. In contrast, amounts below 40% may not result in an emulsion system.

The emulsifiers used in the inventive system may be selected from a wide range of compounds having a total HLB value of about 1.6 to about 7.0. The term HLB refers to the hydrophile-lipophile balance.

The HLB of an emulsifier determines the type of an emulsion that tends to be formed.

The HLB of an emulsifier of the surface-active-agent type is an expression of the size and strength of the hydrophilic and lipophilic groups that compose the emulsifier molecule. A strongly lipophilic emulsifier has a low HLB number, usually less than 9; a highly hydrophilic emulsifier has a high HLB number, over 10. The numbers for typical food emulsifiers range from 2.8 to 40. These numbers have been determined experimentally or by calculation. If two surfactants are used as a blend, the HLB of the combination may be found by multiplying the weight proportion of each surfactant by its HLB value to find its contribution to the total HLB and then adding the two values.

The HLB method is a useful tool in the preparation of most emulsions. By using HLB values, surfactant performance can often be predicted, reducing the number of emulsification tests. It has been unexpectedly found that emulsifiers with low HLB values are useable in this invention. Exemplary groups of compounds may be selected from fatty acid esters and mono and diglycerides. Specific compounds and their respective HLB values include glycerol monooleate (2.8); propylene glycol monostearate (3.4), glycerol monostearate (3.8), lecithin (4.2), and sorbitan monostearate (4.7). The use of emulsifiers with HLB values above about 7.0 do not result in the formation of stable emulsion systems that are useable in this invention. HLB values below 1.6 result in unstable emulsions when formed if at all.

Besides the critical HLB value, it is necessary that the emulsifier be employed in amounts of about 1 to about 15% by weight and preferably about 3 to about 11% by weight of the emulsion system. Amounts above 15% result in the formation of a paste-like product which is generally unstable. Without the use of an emulsifier the admixture of alkyl alcohol and flavor oil does not result in a stable emulsion and it separates within a few minutes.

Once prepared the emulsion system of the invention resembles a microemulsion, that is, it is formed almost immediately and has a transparent jelly like consistency. This microemulsion has been found to exist with most flavor oils, such as spearmint and peppermint flavor oils. The system is stable in the substantial absence of water in amounts of less than about 5% by weight and preferably less than 3% by weight. Preferably, the system is prepared using substantially anhydrous ingredients. The only water normally present is added by use of glycerin having a purity of about 97%, with remainder water. It has been found that the presence of high-era amounts of water in the system enhances separation of the phases. When in a chewing gum, this separation results in the presence of free flavor oil which is then subject to bonding to the gum base and/or to auto-oxidation. By employing the emulsion system using substantially anhydrous ingredients, phase separation does not apparently occur. The emulsion system may also employ additional thickening agents to enable formation of the stable emulsion. Suitable thickening agents include gelatin, alginates, guar gums, and so forth. The use of such thickening agents may require the addition of minor amounts of water to cause dissolution of the agent.

The flavor containing emulsion system of this invention is prepared by dispersing the emulsifier in the flavor oil until a homogenous dispersion is obtained. This may be obtained by simply mixing the ingredients until a first phase is formed, normally referred to as the inner phase. Mixing is performed at room temperature (20°–25° C.) even though a wide range of temperatures may be employed up to the boiling point of the flavor oil constituents. Once the first phase is prepared the alkyl polyol is added while the system is stirred. The polyol may be added all at once or slowly in order to complete the emulsion phase, that is the outer phase. Again room temperature is employed (20°–25° C.) even though not critical. It has been found that the order of addition of the ingredients is critical.

When used in a chewing gum formulation the emulsion system is employed in amounts of about 2 to about 10% by weight of the total chewing gum composition. Once the chewing gum composition has been formed it has been found to exhibit some surprising effects as a result of the manner in which the flavor oil is employed. When chewed, the flavor oil is readily available and has an immediate burst effect. Since the flavor oils are not able to be bound to the gum base as occurs when normally used, the flavor oils are gradually released as the gum, is chewed. This release is noticed for extended periods of time and not just the first few minutes associated with conventional methods of use. In addition, when anhydrous or substantially anhydrous chewing gum compositions are employed auto-oxidation of the flavor oil is not evidenced.

The invention also contemplates the use of more than one emulsion system in a particular chewing gum formulation which may contain different flavor oil components. Multiple flavor release as well as delayed flavor release properties can then be obtained using these systems. The present invention also relates to a method for the preparation of a chewing gum composition which method in its broadest aspects comprises combining the gum base, and optional binders and/or softeners with each other to form a first mixture. This blending operation is performed by conventional means while heating the gum base to plasticize the blend. The heating temperature may vary widely but is for practical purposes preferable about 70° C. to 120° C. This mixture is then blended with the sweetener and optional coloring agent, and filler. When the mixture is finally cooled to a temperature below about 40° C. the flavor containing emulsion system is added. After the ingredients have been blended for a few minutes the remaining components are added, such as the remaining powder sweeteners. Once prepared the composition may be formed into its desired shape such as strips, slabs, chunks, balls, ropes and/or center filled.

When preparing an aspartame sweetened chewing gum the aspartame may be added last. It also must be added separately from the emulsion systems since the presence of oils will result in a reaction with the aspartame. An aspartame containing chewing gum prepared from a substantially anhydrous chewing gum composition using the emulsion systems of this invention is a preferred formulation of this invention.

The following examples are given to illustrate the invention, but are not deemed to be limiting thereof. All percentages given throughout the specification are based upon weight unless otherwise indicated. Percentages of base components are by weight of the base whereas chewing gum composition components are by weight of the final chewing gum formulation.

EXAMPLE 1

The following demonstrates how to prepare emulsions of different flavors in glycerol as a continuous phase. The emulsion formulations are recited in Table 1.

The emulsifier (Table II) which can be a single emulsifier or mixture of emulsifiers is added and dispersed in the flavor oils. To the first mixture the glycerol is slowly added with continuous mixing. The final emulsion is prepared in under 5 minutes of mixing.

The resulting emulsions were stable for up to fifteen days and could be used immediately in a chewing gum formulation or stored for future use.

TABLE 1
COMPOSITION OF FLAVOR EMULSIONS

| COMPONENTS | Peppermint | Cinnamon % | Wintergreen |
|---|---|---|---|
| Flavor | 36.2 | 30.0 | 30.7 |
| Emulsifier | 10.7 | 3.0 | 1.5 |
| Glycerol | 52.1 | 67.0 | 67.8 |

TABLE II
COMPOSITION OF EMULSIFIER

| FLAVOR MIXTURE | EMULSIFIER COMPOSITION |
|---|---|
| Peppermint | Lecithin |
| Cinnamon | Lecithin + Atmos* 300 (1:1) |
| Wintergreen | Lecithin |

*Atmos is a trademark of ICI Americas Inc. and is a blend of mono and diglycerides.

EXAMPLE II

The following example demonstrates how to prepare sugarless chewing gum compositions using the flavor emulsion of Example 1. The chewing gum compositions are recited in Table III.

The gum base is melted at a temperature between 80° C. and 120° C. and in the mixer a gelatine-glycerine solution is added. Then in successive steps with mixing and continuous cooling, the following ingredients are added in respective order: Sorbitol, Flavor Emulsion (below 45° C.). Mannitol, Xylitol, Aspartame, and Spray Dried Flavor. The finished gum mix is taken out of the kettle at 35 to 40° C., cooled and formed into pieces.

The procedure was repeated using the formulation of Table IV for comparative purposes wherein no flavor emulsion was employed.

A taste panel concluded that the gums prepared using the flavor emulsions of this invention had the following attributes that are superior to gum prepared as in Table IV.

Superior Texture, gum does not change texture during the chew.

Superior flavor release, higher impact as well as longer lasting flavor and sweetness.

Also initial stability results have shown that the stability of the gum prepared as in Table III is superior to the regular gum of Table IV. The quality of the gum did not change appreciably after accelerated aging for 40 days at 37° C.

The invention being thus described, it will be obvious that the same may be varied in many ways. Such variations are not to be regarded as a departure from the spirit and scope of the invention and all such modifications are intended to be included within the scope of the following claims.

TABLE III
CHEWING GUM COMPOSITION - INVENTIVE EXAMPLE

| No. | Component | % |
|---|---|---|
| 1. | Gum Base | 28.0 |
| 2. | Sorbitol | 34.0 |
| 3. | Mannitol | 14.0 |
| 4. | Xylitol | 10.0 |
| 5. | Gelatine-Glycerine Solution | 7.5 |
| 6. | Aspartame Encapsulated | 2.0* |
| 7. | Peppermint Oil Spray Dried | 0.5 |
| 8. | Peppermint Flavor Emulsion | 4.0 |

*NOTE: Since encapsulated aspartame contains 16% of aspartame, final concentration of the sweetener is 0.32%.

TABLE IV
CHEWING GUM COMPOSITION - COMPARATIVE EXAMPLE

| No. | Component | % |
|---|---|---|
| 1. | Gum Base | 28.0 |
| 2. | Sorbitol | 36.0 |
| 3. | Mannitol | 14.0 |
| 4. | Xylitol | 10.0 |
| 5. | Gelatine-Glycerine Solution | 7.5 |
| 6. | Aspartame Encapsulated | 2.0 |
| 7. | Peppermint Spray Dried | 0.5 |
| 8. | Peppermint Flavor Mix | 1.5 |
| 9. | Lecithin | 0.5 |

What is claimed is:

1. A flavored chewing gum composition having improved flavor perception which comprises a chewing gum base, a sweetener and an effective amount of a flavor-containing emulsion system, said emulsion system comprising about 19 to about 59% by weight flavoring oil, about 1 to about 15% by weight emulsifier having a total HLB value of about 1.6 to about 7.0 and about 40 to about 80% by weight alkyl polyol selected from the group consisting of glycerin, propylene glycol and mixtures.

2. The chewing gum composition of claim 1 wherein the emulsifier is a fatty acid ester or a mono and diglyceride.

3. The chewing gum composition of claim 2 wherein the emulsifier is selected from the group consisting of glycerol monooleate, propylene glycol monostearate, glycerol monostearate, lecithin, sorbitan monostearate, and mixtures thereof.

4. The chewing gum composition of claim 1 wherein the flavor containing emulsion system is present in an amount of about 2% to about 10% by weight of the chewing gum composition.

5. The chewing gum composition of claim 1 wherein the flavoring is present in an amount of about 25% to about 55% by weight.

6. The chewing gum composition of claim 1 wherein the emulsifier is present in an amount of about 3% to about 11% by weight.

7. The chewing gum composition of claim 1 wherein the alkyl polyol is present in an amount of about 45% to 70% by weight.

8. The chewing gum composition of claim 1 wherein the flavoring oil comprises natural or synthetic oils.

9. The chewing gum composition of claim 1 wherein the flavoring oil is a natural or synthetic flavor oil.

10. The flavoring composition of claim 9 wherein the sweetener is selected from the group consisting of water-soluble sweetening agents, water-soluble artificial sweeteners, dipeptide based sweeteners and mixtures thereof.

11. The chewing gum composition of claim 1 wherein the gum base comprises a natural or synthetic rubber.

12. The chewing gum composition of claim 11 wherein the natural rubber is selected from the group consisting of chicle, jelutong, balata, gutta-percha, lechi caspi, sorva and mixtures thereof.

13. The chewing gum composition of claim 11 wherein the synthetic rubber is selected from the group consisting of butadiene-styrene copolymers, polyisobutylene, isobutylene-isoprene copolymers and mixtures thereof.

14. A flavor-containing emulsion system comprising about 19% to about 59% by weight flavoring oil, about 1% to about 15% by weight emulsifier, and about 40% to about 80% by weight alkyl polyol selected from the group consisting of glycerin, propylene glycol and mixtures.

15. The chewing gum composition of claim 14 wherein the flavoring is present in an amount of about 25% to about 55% by weight.

16. The chewing gum composition of claim 14 wherein the emulsifier is present in an amount of about 3% to about 11% by weight.

17. The chewing gum composition of claim 14 wherein the alkyl polyol is present in an amount of about 45% to about 70% by weight.

18. A method for preparing a flavor-containing emulsion system for incorporation into food products, which comprises:
 (a) dispersing about 19% to about 59% by weight flavoring oil into about 1% to about 15% by weight emulsifier to form a first phase,
 (b) admixing the first phase with about 40% to about 80% by weight alkyl polyol until a stable emulsion is formed.

19. The method of claim 18 wherein the flavoring oil is present in an amount of about 25% to about 55% by weight.

20. The method of claim 18 wherein the emulsifier is present in an amount of about 3% to about 11% by weight.

21. The method of claim 18 wherein the alkyl polyol is present in an amount of about 45% to about 70% by weight.

* * * * *